G. E. HOWE.
WEEDING MACHINE.
APPLICATION FILED MAR. 3, 1916.
1,216,123.
Patented Feb. 13, 1917.
3 SHEETS—SHEET 2.
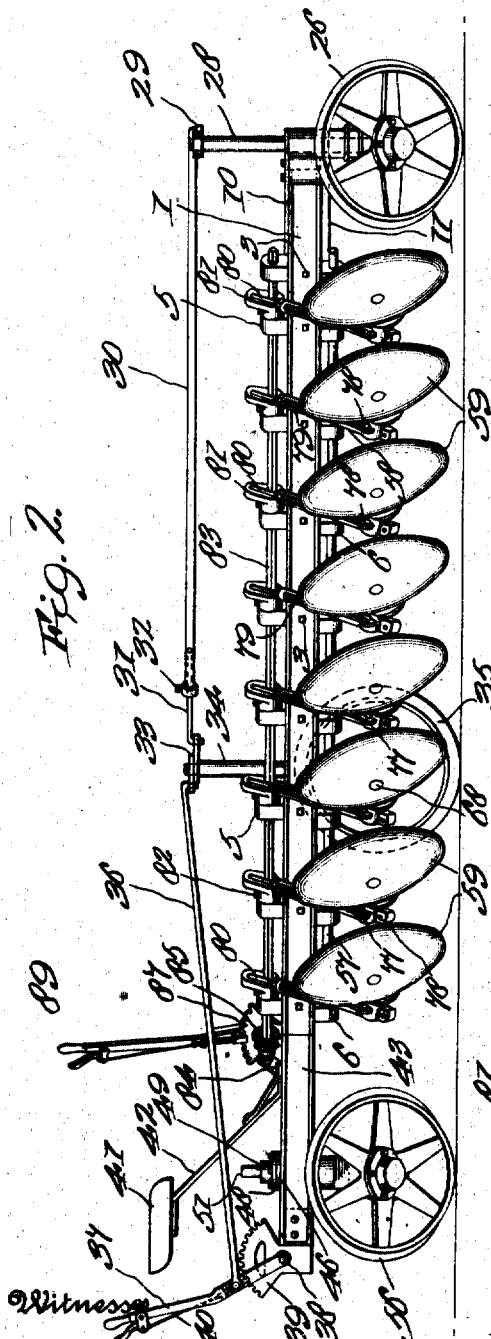
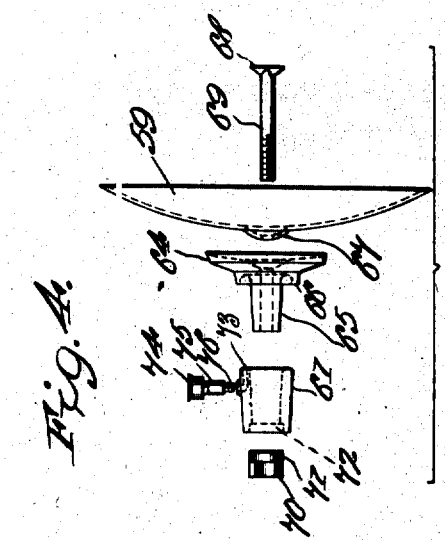
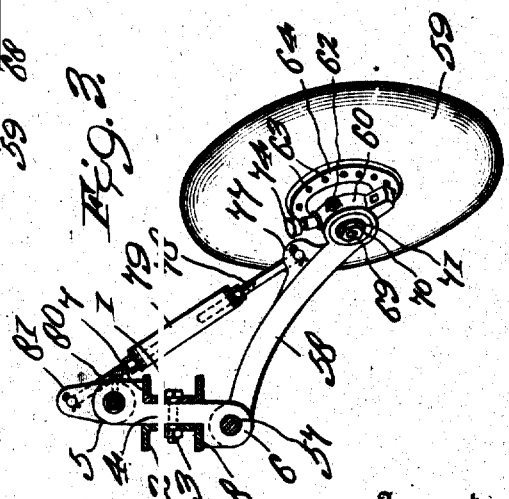
Inventor
George E. Howe,
by Wilkinson, Ginsta & MacKaye
Attorneys
Witnesses
Edwin J. Beller
R. J. MacKinney

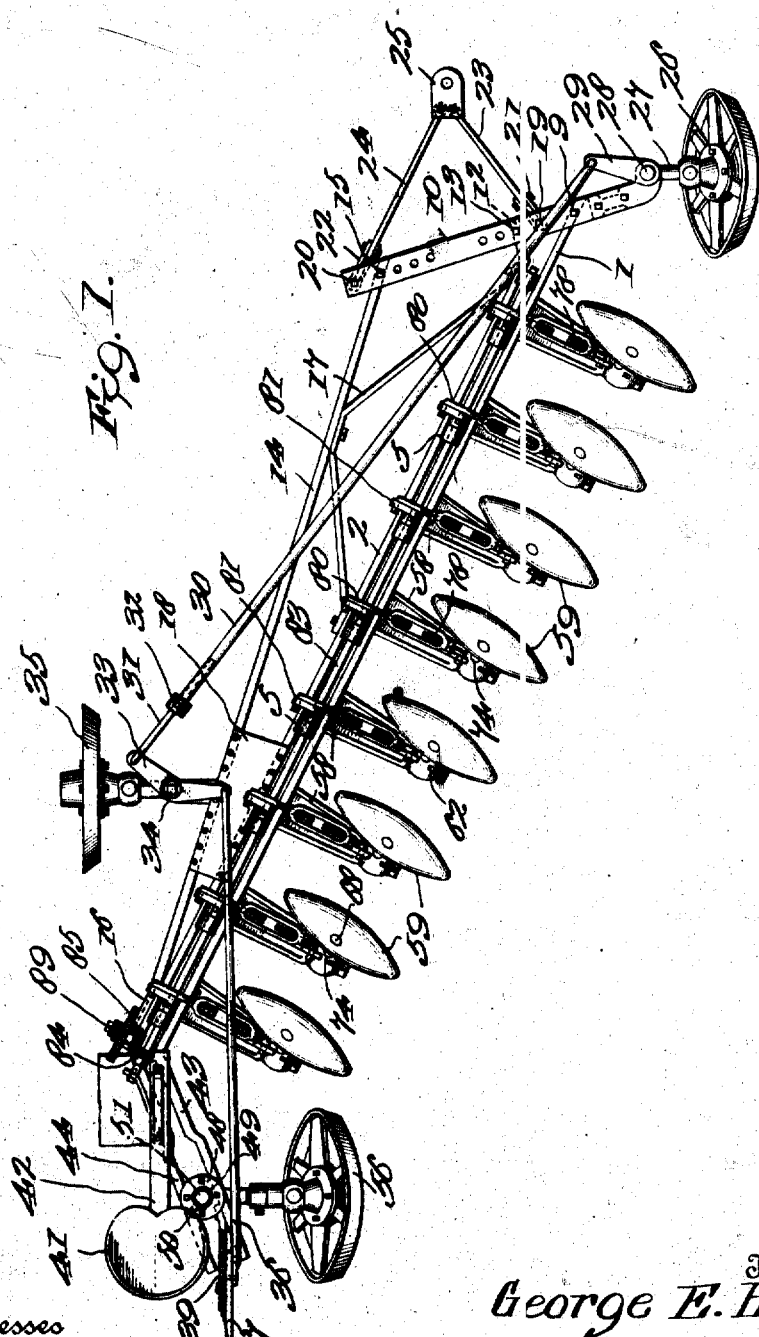

G. E. HOWE.
WEEDING MACHINE.
APPLICATION FILED MAR. 3, 1916.

1,216,123.

Patented Feb. 13, 1917.
3 SHEETS—SHEET 3.

Witnesses
Edwin Beller

Inventor
George E. Howe,
by Wilkinson, Ginter Mackey
Attorneys

UNITED STATES PATENT OFFICE.

GEORGE EDWARD HOWE, OF SALT LAKE CITY, UTAH.

WEEDING-MACHINE.

1,216,123.     Specification of Letters Patent.     Patented Feb. 13, 1917.

Application filed March 3, 1916. Serial No. 81,811.

*To all whom it may concern:*

Be it known that I, GEORGE EDWARD HOWE, a citizen of the United States, residing at Salt Lake City, in the county of Salt Lake and State of Utah, have invented certain new and useful Improvements in Weeding-Machines; and I do hereby declare the following to be a full, clear, and exact description of the invention, such as will enable others skilled in the art to which it appertains to make and use the same.

The present invention relates to improvements in weeding machines in which one or more rotary disks are employed to sever the roots and stalks of the weeds at or beneath the surface of the soil, and one object of the present invention being to provide an improved wheeled frame upon which the disks are mounted and in equipping the frame with mechanism for raising and lowering the disks into and out of contact with the soil and weeds, and for adjusting the depth at which it is desired to operate the disks.

With this and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a top plan view of an improved weeding machine constructed in accordance with my invention.

Fig. 2 is a side elevational view of the same.

Fig. 3 is an enlarged detail view of one of the disks and disk mounting.

Fig. 4 is a disassembled view of the disk and bearings.

Figure 5:
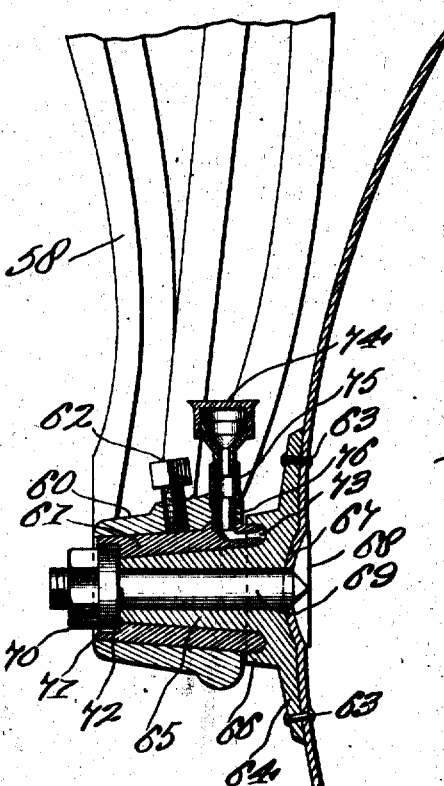
Fig. 5 is an enlarged view of the hanger and disk bearings shown in section.

Referring more particularly to the drawings, the main frame of the machine is preferably of substantially triangular construction, including a diagonally-disposed side or hypotenuse member, which, in the practical construction built up and now in use, is composed of a pair of channel beams 1 and 2 secured together by bolts, or other suitable means, 3 passing through spacing blocks 4 located between the channel beams 1 and 2 and formed at their opposite ends into upper bearings 5 and lower bearings 6; such bearings being offset in opposite directions, as more particularly disclosed in Fig. 3, and formed respectively with shoulders 7 and 8 against which the adjacent flanges of the channel beams 1 and 2 are adapted to abut.

As plainly seen in Fig. 1, the channel beam 1 is, at its forward end, secured, as at 9, between a pair of flat bars 10 and 11, forming the front and short side of the frame; the forward end of the beam 2 being bent, as indicated at 12, and also secured between the bars 10 and 11, as indicated at 13.

The main frame is completed by a beam 14 connected between the opposite ends of the bars 10 and 11 by a bolt, or other means, 15, and to the rear end of the channel beam 2, as indicated at 16. If desired, the frame beams 2 and 14 may be connected by braces 17 and plates 18 secured thereto by rivets, or in any other suitable manner, as may be seen designated or Fig. 1.

The plates 10 and 11 at the front of the machine, are provided with pins 19 and 20 to engage U-shaped or other couplings 21 and 22 to which the rear ends of rods 23 and 24 are secured, the forward ends of the rods being pivoted in a clevis 25, to which the draft animals or traction vehicle is connected.

At its forward end the frame is supported by a ground wheel 26 mounted on an inclined axle 27, which is made in one piece with, or connected to, a post 28 journaled in one end of the bars 10 and 11, and provided with a crank 29 at its upper end for connection to a link 30 including a telescoping section 31 fitted within the link 30 and adjustably held therein by a set screw 32. The link section 31 is secured to one end of a bell crank lever 33 on the upper end of a rotatable post 34 connected to the axle of a second supporting wheel 35, disposed on the opposite side of the machine to the wheel 26 and preferably slightly in rear of the transverse center of the machine.

The opposite arm of the bell crank lever 33 is coupled to a link 36 operable to shift said bell crank lever through a lever 37 pivoted at 38 on a gear segment 39 secured to the frame, and provided with a spring-pressed or other latch 40 for engaging the gear segment 39 and binding the lever 37 in position after actuation by the operator occupying a seat 41 supported by a spring 42 from the framework.

The seat 41 and segment 39 are supported on the rear ends of the channel beams 1 and 2, which are bent from the rear end of the triangular frame, as indicated at 43 and 44 in Fig. 1, they being offset, as there indicated, to embrace cut out portions in opposite sides of a bearing 45 flanged at its upper end 46 and secured by bolts, or other means, 47, to the upper flanges of the channel members 43 and 44, and to the lower flange 48 of a sleeve 49 having a set screw 50. The set screw 50 is adapted to secure a post 51 in any vertically adjusted position, said post 51 carrying a swivel bearing 52 also provided with a set screw 53 for securing therein a journal 54 of an offset and inclined axle 55 on which the rear wheel 56 of the machine is mounted to run loose. Through the swivel bearing 52 the rear wheel 56 will have universal adjustment, and may be adjusted by the operator through the set screw 50 and set screw 53 to any elevation or position required.

Mounted in the lower bearings 6 on the spacing blocks 4 is a spindle 57 of round or other cross sectional configuration; said spindle being provided to receive hangers 58 from which the disks 59 are supported.

Referring more particularly to Figs. 3, 4 and 5, at the lower end of each of the hangers 58 is formed a bearing 60 having a tapering opening into which is fitted a sleeve 61, it being secured against rotation therein by a set screw 62. To the disk 59 is connected by rivets or other means 63, the enlarged base 64 of a hollow spindle 65 formed with an overhanging flange 66 in which one end of the bearing sleeve 61 is received. Centrally the disk 59 is formed with a star-shaped depression 67 which is occupied when in assembled position by a correspondingly shaped head 68 on the bolt 69 passing through the hollow spindle 65, and threaded at its opposite end to receive a nut 70 having a round flange 71 received into a recess 72 in the adjacent end of the bearing sleeve 61 and abutting against the end thereof to bind the parts together.

In the bearing sleeve 61, and leading beneath the overhanging flange 66 of the hollow spindle 65, is a duct 73 communicating with a grease cup 74 through a pair of threaded sleeves 75 and 76 which are inserted after the bearing sleeve 61 has been assembled within the bearing 60. The bearing, bearing sleeve, hollow spindle, and bolt, are preferably of chilled steel on the working surfaces thereof to better sustain the friction and wear which devolve upon these parts.

Each hanger 58 is formed with an upstanding eye 77 for engagement by one end of a threaded rod 78 secured for adjustment in a turn buckle 79; said turn buckle carrying a similar threaded rod 80 coupled at its upper end in a crank arm 81 formed with a square hole and fitted to a square shaft 83 and fixed by a set screw or key 82 to rotate with said square or other shaped shaft 83 journaled in the upper bearings 5 of the spacing blocks 4.

Figure 6:
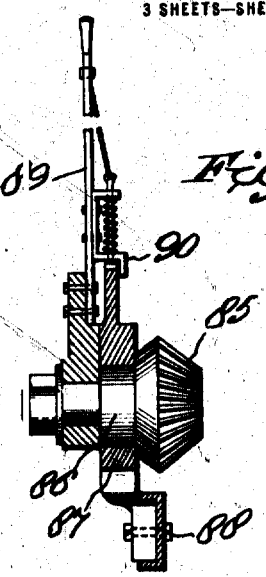
Fig. 6 is a sectional view of the shaft-actuating mechanism.
Figure 7:
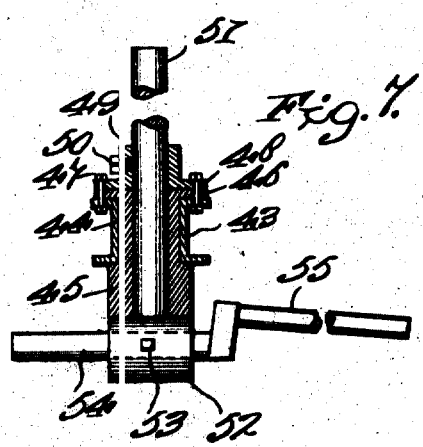
Fig. 7 is a sectional view of the rear wheel axle universal adjustable construction.

At its rear end the shaft 83 is provided with a bevel gear wheel 84 in mesh with a similar bevel gear wheel 85, illustrated more particularly in Fig. 6 to be fitted on the end of a stub shaft 86 journaled in a segmental rack 87 fixed at 88 to the frame of the machine. In operative relation to rotate the shaft 86, is a lever 89 provided with a spring-pressed latch 90 for engaging the teeth of the rack 87 and securing the gear wheels and shaft 83 in the adjusted position.

In operating the machine the same is drawn along by draft animals or a traction vehicle hitched to the clevis 25, and as the same proceeds over the field the series of disks 59, having been lowered into contact with the ground through the lever 89, and being supported at an inclination, will roll over the roots and stalks of the weeds substantially in the manner of a rotating knife or saw, and will cut the same and effectually dislodge the roots. During the progress of the machine the inclination at which the front and rear wheels 26 and 56 are arranged will prevent the machine from skidding sidewise, and the rear wheel 56 will have a universal movement on its axle 55. As may become necessary in turning at each headland, or when transporting the machine to the place of operation, it may be desirable to raise the disks out of engagement with the ground, and this may be accomplished by swinging the lever 89 toward the operator occupying the seat 41, which will, through the gear wheels 85 and 84, transmit a rotary motion to the shaft 83, thereby rocking the cranks 81 up to the position shown in Figs. 1 and 2; such movement being transmitted through the links constituted by the turn buckle 79 and rods 78 and 80 to the hangers 58, swinging the latter about the spindle 57 and raising the disks 59. The parts will be held in the elevated position by the latch 90 engaging the segment 87 until their subsequent use is desired, when by disengaging the latch 90 from the gear segment 87 and by a reverse movement of the same, the gear wheel 85 will be rotated in the opposite direction, similarly reversely rotating the gear wheel 84, and the connected shaft 83 lowering the cranks 81 and again bringing the disks 59 into contact with the ground.

A limited adjustment is given by means of the turn buckle 79 regulating the height and depth to which the disks 59 may be elevated and lowered; and otherwise, the adjustment is effected by operation of the lever 89.

On turning, the operator grasps the lever 37, releasing the latch 40 from engagement with the segmental rack 39, when said lever is free to be moved and shift the link 36, swinging the bell crank lever 33 and turning the post 34 to which is connected the axle of the wheel 35; this turning movement is communicated to the forward wheel 26 through the telescoping link 30 and crank 29, which simultaneously revolves the post 28 and connected axle 27.

If it becomes necessary to operate the machine in a circle, the steering wheels 26 and 35 may be held in any position to guide the machine in any direction through the lever 40 engaging the segment 39 after the lever 37 has been moved to the required position.

It is obvious that those skilled in the art may vary the details of construction and arrangements of parts without departing from the spirit of my invention, and therefore I do not wish to be limited to such features except as may be required by the claims.

I claim:

1. In a weeding machine, the combination of a frame including beams, spacing blocks interposed between said beams, shoulders on said spacing blocks above and below said beams for engaging therewith, upper and lower bearings on said spacing blocks, a spindle journaled through said lower bearings, hangers pivotally mounted on said spindle, cutting elements carried by said hangers, a rock shaft journaled in the upper bearings, cranks on said rock shaft, links connected between said cranks and hangers and means for operating said rock shaft to raise, lower and adjust the height of said cutting elements, substantially as described.

2. In a weeding machine, the combination of a frame including oppositely disposed beams, spacing blocks interposed between said beams, upper and lower bearings on said spacing blocks, a spindle journaled through said lower bearings, hangers hingedly mounted on said spindle, cutting elements carried by said hangers, a rock shaft journaled in said upper hangers, means for actuating said rock shaft, cranks on said rock shaft, and adjustable links connected between said cranks and hangers for adjusting, raising and lowering said cutting elements, said links including threaded rods connected respectively to the cranks and hangers, and turnbuckles coupling said rods, substantially as described.

3. In a weeding machine, the combination of a frame including beams, spacing blocks interposed between said beams, shoulders on said spacing blocks above and below said beams for engaging therewith, fastening means passing through said beams and spacing blocks, upper and lower bearings on said spacing blocks, a spindle journaled through said lower bearings, hangers pivotally mounted on said spindle, cutting elements carried by said hangers, a rock shaft journaled in said upper bearing, cranks on said rock shaft, adjustable links connected between said cranks and hangers for raising, lowering and adjusting said cutting elements, said links comprising threaded rods connected respectively to said cranks and hangers, and turnbuckles for adjustably coupling said rods, and means for actuating said rock shaft and securing same in adjusted position, substantially as described.

4. In a weeding machine, the combination of a frame including a diagonally disposed member composed of a pair of channel beams assembled together with their flanges outward, a series of spaced blocks interposed between said channel beams, fastening means passing through said beams and blocks, upper and lower oppositely disposed shoulders on said spacing blocks engaging above and below said beams, upper and lower bearings on said spacing blocks, a spindle journaled through said lower bearings, hangers pivotally depending from said spindle, cutting elements supported from said hangers, a rock shaft journaled in said upper bearings, cranks on said rock shaft, links connected between said cranks and hangers, a bevel pinion on said rock shaft, a stub shaft disposed angularly to said rock shaft, a bevel pinion on said stub shaft meshing with said first-named bevel pinion, a lever connected to oscillate said stub shaft, means associated with said lever for securing same in adjusted position, substantially as described.

5. In a weeding machine, the combination of a triangular frame including a base member disposed diagonally to the line of travel and composed of a pair of channel beams, spacing blocks interposed between said beams, fastening means passing through said beams and blocks, shoulders on said blocks for abutting against the upper and lower flanges of said beams, upper and lower bearings on said blocks, a spindle journaled in said lower bearings, hangers pivotally depending from said spindle, cutters carried by said hangers, a rock shaft journaled in said upper bearings, means for actuating said rock shaft, cranks on said rock shaft, adjustable links interposed between said cranks and hangers, braces connected between the base and other members of said frame, wheels supporting said frame, a rearward extension formed by a continuation of said channel beams, a bearing clamped between said channel beams forming the rearward extension, and a rear wheel supported from said bearing, substantially as described.

In testimony whereof, I affix my signature.

GEORGE EDWARD HOWE.